(12) United States Patent
Poulat

(10) Patent No.: US 9,695,276 B2
(45) Date of Patent: Jul. 4, 2017

(54) METHOD FOR PRODUCING A BIO-PET POLYMER

(75) Inventor: Françoise Poulat, Sciez (FR)

(73) Assignee: SOCIETE ANONYME DES EAUX MINERALES D'EVIAN et en abrégé"S.A.E.M.E.", Evian-les-Bains (FR)

( * ) Notice: Subject to any disclaimer, the term of this patent is extended or adjusted under 35 U.S.C. 154(b) by 5 days.

(21) Appl. No.: 14/343,457

(22) PCT Filed: Sep. 7, 2012

(86) PCT No.: PCT/EP2012/067581
§ 371 (c)(1),
(2), (4) Date: Mar. 7, 2014

(87) PCT Pub. No.: WO2013/034743
PCT Pub. Date: Mar. 14, 2013

(65) Prior Publication Data
US 2014/0197580 A1 Jul. 17, 2014

(30) Foreign Application Priority Data
Sep. 8, 2011 (WO) .................. PCT/IB2011/002462

(51) Int. Cl.
*C08G 63/199* (2006.01)
*C08G 63/78* (2006.01)
*C08G 63/183* (2006.01)
*C08G 63/80* (2006.01)
*B29D 22/00* (2006.01)

(52) U.S. Cl.
CPC ......... *C08G 63/199* (2013.01); *B29D 22/003* (2013.01); *C08G 63/183* (2013.01); *C08G 63/78* (2013.01); *C08G 63/80* (2013.01)

(58) Field of Classification Search
None
See application file for complete search history.

(56) References Cited

U.S. PATENT DOCUMENTS

| 4,263,364 | A | 4/1981 | Seymour et al. |
| 4,340,721 | A | 7/1982 | Bonnebat et al. |
| 5,616,496 | A | 4/1997 | Frost et al. |
| 2004/0236065 | A1 | 11/2004 | Denis et al. |
| 2008/0216391 | A1 | 9/2008 | Cortright et al. |
| 2009/0124829 | A1 | 5/2009 | Gong |
| 2009/0246430 | A1* | 10/2009 | Kriegel ............. C08G 63/183 428/36.6 |
| 2010/0028512 | A1* | 2/2010 | Kriegel ............. C08B 30/18 426/397 |
| 2010/0168461 | A1 | 7/2010 | Berti et al. |
| 2010/0314243 | A1 | 12/2010 | Frost et al. |
| 2011/0262669 | A1 | 10/2011 | Kriegel et al. |

FOREIGN PATENT DOCUMENTS

| EP | 0041035 | 12/1981 |
| WO | WO 2007/001536 A1 | 1/2007 |
| WO | WO 2009/120457 A2 | 10/2009 |
| WO | WO 2010/028206 A1 | 3/2010 |
| WO | WO 2010/078328 A2 | 7/2010 |
| WO | WO 2011/017560 A1 | 2/2011 |
| WO | WO 2011/044243 A1 | 7/2011 |
| WO | WO 2011/085223 A1 | 7/2011 |

OTHER PUBLICATIONS

Product Information Page, DOW, 1, 4-cyclohexanedimethanol. Accessed Jul. 23, 2016.*

\* cited by examiner

*Primary Examiner* — Monica Huson
(74) *Attorney, Agent, or Firm* — Finnegan, Henderson, Farabow, Garrett & Dunner, L.L.P.

(57) ABSTRACT

The invention relates to a method for producing a bio-PET polymer comprising the following steps: Step A) providing at least one diacid compound, comprising a terephtalate compound; Step B) providing at least one diol compound, comprising monoethylene glycol; wherein —at least one of the terephtalate compound and/or the monoethylene glycol is obtained from at least one bio-based material, and —at least one of the diacid compound and/or the diol compound further comprises at least one crystallization retarding compound; and Step C) copolymerizing a mixture of the diacid compound and the diol compound to obtain a bio-PET polymer comprising diacid units and diol units, comprising up to 7.5 mol % of unit(s) corresponding to the at least one crystallization retarding compound, based on the total number of moles of diacid units contained in the bio-PET. The invention also relates to a method for producing a bio-PET packaging element, comprising the following steps: —performing the method described above; and —Step D) converting the bio-PET into the bio-PET packaging element.

20 Claims, No Drawings

METHOD FOR PRODUCING A BIO-PET POLYMER

CROSS REFERENCE TO RELATED APPLICATIONS

This application is a national phase application based on PCT/EP20121067581, filed Sep. 7, 2012, which claims the priority of PCT/IB2011/002462, filed Sep. 8, 2011, the contents of all of which are incorporated herein by reference.

FIELD OF THE INVENTION

The invention concerns a method for producing a bio-PET, and in particular methods for producing a bio-PET with using a crystallization retarding compound. The invention also relates to a method for producing bio-PET packaging elements such as bottles, and in particular a method for producing bio-PET bottles with using a crystallization retarding compound.

BACKGROUND

For several tens of years, polyester, in particular polyethylene terephthalate (PET) has been increasingly used in the production of hollow containers, in particular bottles.

Commercial PET (called hereafter oil-PET) is generally produced with diacid and diol monomers synthesized with petrochemically-derived raw material (raw materials obtained from petrochemistry). Because of decline of world oil reserve and increasing oil prices, and/or because of the need to improve the carbon footprint of materials, many researches have been made for completely or partially replacing petrochemically-derived raw material by raw material coming from biologically based materials (bio-materials).

A polyester made from bio-materials has already been proposed. This polyester is polylactic polyester (PLA) and is made with lactic acid as acid monomer. Lactic acid is produced from bio-materials like rice, corn, sugars, etc.

However, PLA cannot replace PET in all applications due to the different properties of PLA and PET. For example, PLA cannot be used to produce containers for carbonated beverages due to the lower gas barrier property of PLA.

Consequently, investigations have been done for providing a method for producing PET from monomers obtained at least partially from bio-materials, hereafter called bio-PET.

WO 2009/120457 provides a bio-PET. This bio-PET comprises 25 to 75 wt. % of terephthalate compound selected from terephthalic acid, dimethyl terephthalate, isophthalic acid, and a combination thereof. It also comprises 20 to 50 wt. % of diol compound selected from ethylene glycol, cyclohexane dimethanol, and a combination thereof. At least 1 wt. % of the terephthalate compound and/or the diol compound is obtained from bio-materials. The bio-PET of WO 2009/120457 can be used for manufacturing beverage containers. The bio-PET of WO 2009/120457 can be differentiated from an oil-PET with a method using $^{14}C$ (carbon-14) detection.

Indeed, it is known that $^{14}C$, which has a half-life of 5,700 years, is found in bio-materials but not in raw material coming from petrochemical industry. The amount of $^{14}C$ can be determined by measuring the number of disintegrations per minute per gram carbon value (dpm/gC) reflecting the decay process of $^{14}C$. Such a measurement is possible through liquid scintillation counting.

Thus, a PET beverage container having a high $^{14}C$ content is a PET beverage container made at least partly from bio-PET, whereas a PET beverage container having a tow $^{14}C$ content is a PET beverage container totally made from oil-PET. The amount of bio-material can be simply evaluated by using $^{14}C$ measurements, for example according to method ASTM D6866-10.

Although the bio-PET described in WO 2009/120457 erroneously lists isophtatic acid as a terephtalate compound, it does not disclose it as a compound that can be used as a crystallization retarding compound. It does not disclose the amount of crystallization retarding compound that should be used to obtain a bio-PET that is sufficiently clear (spherulitic crystallization can occur and decrease clarity) and/or that has the needed properties for packaging elements such as beverage containing bottles. There is need for methods to prepare bio-PET materials and packaging elements, such as bottles, that allow a bio-PET that provide a bio-PET that sufficiently clear and/or that has the needed properties for packaging elements such as beverage containing bottles.

SUMMARY

The invention addresses at least one of the problems or needs mentioned above by providing a method for producing a bio-PET polymer comprising the following steps:
Step A) providing at least one diacid compound, comprising a terephtalate compound;
Step B) providing at least one diol compound, comprising monoethylene glycol; wherein:
at least one of the terephtalate compound and/or the monoethylene glycol is obtained from at least one bio-based material, and
at least one of the diacid compound and/or the diol compound further comprises at least one crystallization retarding compound; and
Step C) copolymerizing a mixture of the diacid compound and the diol compound comprising the at least one crystallization retarding compound, to obtain a bio-PET polymer comprising diacid units and diol units, comprising up to 7.5 mol % of unit(s) corresponding to the at least one crystallization retarding compound, based on the total number of moles of diacid units contained in the bio-PET.

The inventors have surprisingly discovered not only that the use of the crystallization retarding compound can prevent spherulitic crystallization, but also that it can allow obtaining crystallization of bio-PET into very small crystals and that it can give bio-PET having interesting properties, such as improved and broader processing parameters, for example that can:
avoid crystallization of the material, in particular crystallization of performs obtained from the material, and thus allow a better stretching; and/or
increase the fluidity of the material upon heating, and thus allow heating at a higher temperature and/or stretching better.

The invention also provides a method for producing a bio-PET packaging element, comprising the following steps:
performing the method of any claims 1 to 12; and
Step D) converting the bio-PET into the bio-PET packaging element.

DETAILED DESCRIPTION

For the sake of the description and the claims, the following definitions are to be considered.

In the present application "bio-materials" refer to biologically based materials, typically obtained from vegetals. Such materials are also referred to or "bio-sourced materials", or "bio-based materials" or "renewable materials".

"Bio-PET" means a PET polymer produced at least partly from monomers coming from bio-materials. One can also refer to "bio-based PET" or "bio-sourced PET" or "PET from renewable resource" or "renewable PET" or "PET from vegetal origin".

In the present application, "compound(s)" refers to monomer(s) used to prepare the PET polymer. The compounds are engaged in a polymerization reaction to provide a polymer presenting corresponding units or moieties. Thus the PET polymer obtained by the process will typically contain:

"moieties" or "units" corresponding to diacid compounds, for example terephtalic or terephtalate units or moieties or isophtalic units or moieties, and "moieties" or "units" corresponding to diol compounds, for example monoethylene glycol units or moieties, or diethylene glycol units or moieties, or 1,4-cyclohexanedimethanol units or moieties.

PET Polymer

The bio-PET polymer has typically the general formula [—O—OC—X—CO—O—Y—]$_n$, wherein X is a group of the diacid, for example —$C_6H_4$— for a terephtalic unit, and Y is a group of the diol, for example —$CH_2$—$CH_2$— for a monoethylene glycol unit, and n is a degree of polymerisation. Herein the following conventions are used for calculations of amounts in the polymer:

the formula of a diacid unit is —OC—X—CO—, for example —O—$C_6H_4$—CO— for a terephtalic unit, the formula of a diol unit is —O—Y—O, for example —O—$CH_2$—$CH_2$—O for a monoethylene glycol unit, or —O—$CH_2$—$CH_2$—O—$CH_2$—$CH_2$—O— for a diethylene glycol unit.

For sake of simplicity one sometimes refers to monomers for units or moieties.

The method for producing the bio-PET comprises the steps of providing diacid and diol compounds as monomers, and copolymerizing. The crystallization retarding compound is a diacid or diol monomer compound further to the terephtalate monomer compound and to the monoethylene glycol monomer. It is copolymerized with the terephtalate monomer compound and the monoethylene glycol monomer.

Typically the molar ratio in the bio-PET between units corresponding to the diacid compound(s) and units corresponding to the diol compound(s) is 0.9 to 1.1. Typically the weight ratio in the bio-PET between units corresponding to the diacid compound(s) and units corresponding to the diol compound(s) is from 1.98 to 2.42. The one skilled in the art knows the relevant amounts of diacid and diol compounds to be provided, and the appropriate process conditions, to obtain such a molar or weight ratio.

Step A) Diacid

The diacid compound comprises a terephtalate compound. This terephtalate compound is a monomer. The terephtalate compound can be terephtalic acid or dimethylterephtalate. Terephtalic acid, for example terephtalic acid marketed a "Pure Terephtalic Acid" (PTA) is usually preferred. Advantageously the diacid compound comprises at least 96.5 mol % of terephtalate compound. This monomer compound provides terephtalic units.

In one embodiment all or at least a part of the terephtalate compound is obtained from a bio-material. The bio-material, from which the terephtalate compound is obtained, is for example produced from a biomass comprising terpene, terpenoid or a mixture thereof, or from para-xylene obtained from a bio-material, or from muconic acid obtained by a microbiological process from a biomass.

Some appropriate methods for producing terephtalate compounds such as terephtalic acid (PTA) or dimethylterephtalate (DMT) from bio-materials are described below.

A method for producing terephtalic acid from bio-materials consists in providing bio-materials comprising terpene, terpenoid or a mixture thereof. Terpene, terpenoid or the mixture thereof are extracted from the bio-materials and then converted to para-cymene. Para-cymene is then converted to terephtalic acid by oxidation as disclosed in US 2010/0168461. An example of terpene-containing bio-materials is, for example, lemon.

Another method of producing terephtalic acid from bio-materials comprises converting para-xylene obtained from bio-materials to terephtalic acid, preferably pure terephtalic acid. Para-xylene obtained from bio-materials as reported as marketed by Virent as BioForm PX™. It can be obtained by a catalytic process that converts plant-based sugars into the para-xylene. The sugars can come from a wide variety of feedstock including sugar cane, corn, and woody biomass. Appropriate catalytic processes are for examples described in patent applications US 2008/0216391, U.S. Pat. No. 109,877 and WO 2010028206. Such processes allow to produce and aromatic-rich stream that can be reformatted to generate para-xylene. Such processes typically comprises a step of aqueous phase reforming (APR) by reacting sugars with $H_2$ and a de-oxygenation catalyst to provide an oxygenate, and a step of condensation of the oxygenate in the presence of an acidic catalyst, to obtain a mixture comprises para-xylene. This mixture can be purified or reformatted to para-xylene.

Another method for producing terephtalic acid and/or dimethylterephtalate from bio-materials comprises producing a muconic acid from a biomass by a microbiological process involving micro-organisms, and then converting the muconic acid into terephtalic acid and/or dimethylterephtalate. Such a method is described in document US 2010/0314243. Typically the muconic acid in cis-cis-muconic acid. Appropriate microbiological processes are for example described in documents U.S. Pat. No. 5,616,496 and WO 2011/017560. Muconic acid, preferably after in the form of trans-trans-muconic acid, optionally after a chemical transformation step from a cis-cis form to a tans-trans form, can then be transformed into terephtalic acid and/or dimethytterephtalate by chemical reactions involving a dienophile compound such as ethylene or acetylene. Such reactions are described in documents US 2010/0314243 and WO 2011/017560 and referenced cited in such documents. It is mentioned that the ethylene or acetylene compound are preferably from bio-materials. These can be from bio-ethanol as mentioned below in the production of monoethylene glycol. Preferably the ethylene or acethylene from bio-material used to produce terephtalic acid and/or dimethylterephtalate from bio-materials is an intermediate extracted from the production of monooethylene glycol from bio-materials. This provide a most economical and efficient use of streams of materials and intermediates.

Another method for producing terephtalic acid from bio-materials comprises producing isoutanol from biomass by fermentation, then converting isobutanol to isobutene, then converting isobutene to isooctane by oligomerization, then converting isobutene to xylenes such as para-xylene by dehydrocyclization, then converting para-xylene to terephtalic acid, as disclosed in documents WO 2011/044243 and/or WO 2011/085223.

Another method for producing terephtalic acid from bio-materials comprises producing 2,5-furandicarboxylate (2,5-FDCA) from a biomass and then converting to terephtalic acid. For example a biomass is converted to a sugar comprising fructose, sucrose and mixtures thereof, then the sugar is converted to 5-hydroxymethylfurfural, then 5-hydroxymethylfurfural is oxidized to 2,5-furandicarboxylate, then 2,5-furandicarboxylate is reacted with ethylene in the presence of a solvent to produce a bicyclic ether, then the bicyclic ether is dehydrated to terephtalic acid. Such a method is for example described in document US 2009/0124829. It is mentioned that the ethylene is preferably from bio-materials. Preferably the ethylene from bio-material used to produce bicyclic is an intermediate extracted from the production of monooethylene glycol from bio-materials. This provide a most economical and efficient use of streams of materials and intermediates.

Another method for producing terephtalic acid from bio-materials comprises converting a glucose or fructose from a biomass to 5-hydroxymethylfurfural (HMF), then hydrogenating the HMF to 2,5-dimethylfuran (DMF), then reacting the DMF with ethylene under cycloaddition reaction conditions and in the presence of a catalyst to produce para-xylene, then oxidizing the para-xylene with oxygen to produce terephthalic acid. It is mentioned that the ethylene is preferably from bio-materials. Preferably the ethylene from bio-material used to produce bicyclic is an intermediate extracted from the production of monooethylene glycol from bio-materials. This provide a most economical and efficient use of streams of materials and intermediates.

Step B) Diol

The diol compound comprises monoethylene glycol. The diol compound is a monomer. Advantageously the diol compound comprises at least 92.5 mol % of monoethylene glycol, and preferably at least 99% or even 100%. This monomer compound provides mainly monoethylene glycol units. Diethylene glycol units are also often inherently present in PET since they are formed during synthesis by condensation of two molecules of ethylene glycol. Depending on the concentration of diethytene glycol units desired in the final polyester, some diethylene glycol monomer compounds can be added or some synthesis conditions can be controlled in order to limit diethytene glycol formation. Advantageously, the molar concentration of diethylene glycol units in the bio-PET is of less than 3.5 mol % with respect to the number of moles of diol units, and preferably less than 1 mol %.

In a preferred embodiment all or a at least a part of the monoethylene glycol in obtained from a bio-material. Such a bio-material can be obtained from ethanol (bio-ethanol) produced from renewable bio-materials.

Then, bio-ethanol can be transformed into different chemical derivatives via classical chemical method. Bio-ethanol can be transformed into ethylene and ethylene oxide. Ethylene oxide is further hydrated to obtain ethylene glycol.

The bio-materials from which monoethylene glycol can be obtained, can be produced from one of the following materials:
  plant like beet, sugar cane, maize or wheat, citrus fruits, woody plants, etc.; or
  plant waste like sawdust, wheat straw or wheat corns, natural fibres, cellulosics, lignecelluosics, hemicelluloses, etc.

Producing bio-ethanol from bio-materials can comprise the following steps:
  extracting glucose from bio-materials;
  fermenting glucose using yeasts added into a mixture of sugar and water; and
  distilling bio-ethanol.

When bio-materials contain at least wheat or maize, enzymatic or acid hydrolysing bio-materials can be carried out for transforming wheat starch or maize starch into glucose. This step is not necessary in the case of beet, sugar cane or citrus fruit because glucose can be directly extracted from these bio-materials.

Bio-Materials in the Bio-PET

At least one of the diacid compound and/or the diol compound is obtained from at least one bio-material.

Preferably at least 0.5 wt. % of units, compared to the total amount of units in the bio-PET, correspond to a diacid compound and/or a diol compound obtained from bio-materials. Preferably at least 0.5 mol % of units compared to the total amount of units in the bio-PET, correspond to a diacid compound and/or a diol compound obtained from bio-materials. These amounts are preferably of at least 1% wt. % or mol %, preferably of at least 5 wt. % or mol %, preferably of at least 10 wt. % or mol %, preferably of at least 15 wt. % or mol %, preferably of at least 20 wt. % or mol %. In some embodiment these amount can be of from 20 to 25 wt. % or mol %, or of from 25 to 30 wt. % or mol %, or of from 30 to 35 wt. % or mol %, or of from 35 to 40 wt. % or mol %, or of from 40 to 45 wt. % or mol %, or of from 45 to 55 wt. % or mol %, or of from 55 to 65 wt. % or mol %, or of from 65 to 75 wt. % or mol %, or of from 75 to 85 wt. % or mol %, or of from 85 to 90 wt. % or mol %, or of from 90 to 95 wt. % or mol %, or of from 95 to 99 wt. % or mol %, or of from 99 to 100 wt. % or mol %.

Preferably one provides at least 0.5 wt. % of the diacid compound and/or the diol compound obtained from bio-materials, compared to the total amount of diacid compounds and diol compounds. Preferably one provides at least 0.5 mol % of the diacid compound and/or the diol compound obtained from bio-materials, compared to the total amount of diacid compounds and diol compounds. These amounts are preferably of at least 1% wt. % or mol %, preferably of at least 5 wt. % or mol %, preferably of at least 10 wt. % or mol %, preferably of at least 15 wt. % or mol %, preferably of at least 20 wt. % or mol %. In some embodiment these amount can be of from 20 to 25 wt. % or mol %, or of from 25 to 30 wt. % or mol %, or of from 30 to 35 wt. % or mol %, or of from 35 to 40 wt. % or mol %, or of from 40 to 45 wt. % or mol %, or of from 45 to 55 wt. % or mol %, or of from 55 to 65 wt. % or mol %, or of from 65 to 75 wt. % or mol %, or of from 75 to 85 wt. % or mol %, or of from 85 to 90 wt. % or mol %, or of from 90 to 95 wt. % or mol %, or of from 95 to 99 wt. % or mol %, or of from 99 to 100 wt. % or mol %.

To determine the presence and the amount in the bio-PET of units corresponding to monomers obtained from bio-materials, a good method is measuring decay process of $^{14}C$ (carbon-14), in disintegrations per minute per gram carbon or dpm/gC, through liquid scintillation counting. Decay process of the units coming from bio-materials is at least about 0.1 dpm/gC. The molar content of bio-sourced carbon atoms (carbon obtained from a bio-material, with reference to the total carbon content) in the bio-PET as measured from $^{14}C$ contents, typically according to ASTM D6866-10, is preferably of at least 1%, preferably at least 10%, preferably at least 15%, for example from 15% to 20%, or from 20% to 25%, or from 25% to 30%, or from 30% to 40%, or from 40% to 50%, or from 50% to 60%, or from 60% to 70% or from 70% to 80%, or from 80% to 90%, or from 90% to 95%, or from 95% to 99% or from 99% to 100%.

The content of bio-material in the bio-PET is preferably of at least 1% by weight, preferably at least 10%, preferably at least 15%, for example from 15% to 20%, or from 20% to 25%, or from 25% to 30%, or from 30% to 40%, or from 40% to 50%, or from 50% to 60%, or from 60% to 70% or from 70% to 80%, or from 80% to 90%, or from 90% to 95%, or from 95% to 99% or from 99% to 100%. The content of bio-material in the bio-PET can be considered according to various methods and calculations.

In one embodiment the content of bio-material in the bio-PET is considered as the content of bio-sourced carbon, as described above.

In one embodiment the content of bio-material in the bio-PET is considered as the content by weight of diacid and diol compounds used to prepare the bio-PET, obtained from bio-materials, compared to the total of amount of diacid and diol compounds used to prepare the bio-PET.

In one preferred embodiment the content of bio-material in the bio-PET as the content by weight of units corresponding to compounds obtained from a bio-material, used to prepare the bio-PET, compared the total amount of units, using the set of calculation rules (1), preferred, or the set of calculation rules (2) below.

Set of Calculation Rules (1)
formula of diacid unit —OC—X—CO—, for example —OC—C$_6$H$_4$—CO— (Mw 132.13 g/mol) for unit corresponding to terephtalic acid,
formula of diol unit —O—Y—O—, for example O—CH$_2$—CH$_2$—O— (Mw 60.05 g/mol) for unit corresponding to ethylene glycol.
Set of Calculation Rules (2)
formula of diacid unit —OOC—X—CO—, for example —OOC—C$_6$H$_4$—CO— (Mw 144.13 g/mol) for unit corresponding to terephtalic acid,
formula of diol unit —Y—O—, for example —O—CH$_2$—CH$_2$— (Mw 48.05 g/mol) for unit corresponding to ethylene glycol.

Crystallization Retarding Compound The bio-PET comprises up to 7.5 mol %, preferably at least 0.1 mol %, preferably up to 5 mol %, of units corresponding to the at least one crystallization retarding compound, based on the total number of moles of diacid units contained in the bio-PET.

In a preferred embodiment the bio-PET comprises up to 7.5 mol %, preferably at least 0.1 mol %, preferably up to 5 mol %, of units corresponding to the at least one crystallization retarding compound, based on the total number of moles of diol units contained in the bio-PET.

The crystallization retarding compound is provided as a diacid compound and/or diol compound and mixed at least with the terephtalate compound and the monoethylene glycol, before or during the step of copolymerizing.

Crystallization retarding compounds typically avoid spherulitic crystallization and allow a formation of very small crystals such that the produced bio-PET is suitable for manufacturing a packaging element, such as a bio-PET bottle, with acceptable mechanical properties and/or processing parameters. Such properties and parameters can be advantageous in certain applications, such as transparency, since it is well known that one of the most important constraints imposed on PET for its use in the field of packaging for beverages is the transparency of the containers.

The at least one crystallization retarding compound can be a diacid compound, for example isophthatic acid, naphthalenedicarboxylic acid, cyclohexanedicarboxylic acid, cyclohexanediacetic acid, succinic acid, glutaric acid, adipic acid, azelaic acid or sebacic acid. The at least one crystallization retarding compound can be a diol compound, for example an aliphatic diol comprising from 3 to 20 carbon atoms, a cycloaliphatic diol of 6 to 20 carbon atoms, or an aromatic diol comprising from 6 to 14 carbon atoms, such as diethylene glycol, triethytene glycol, isomers of 1,4-cyclohexanedimethanol, 1,3-propanediol, 1,4-butanediol, 1,5-pentanediol, 3-methyl-2,4-pentanediol, 2-methyl-1,4-pentanediol, 2,2,4-trimethyl-1,3-pentanediol, 2-ethyl-1,3-hexanediol, 2,2-diethyl-1,3-propanediol, 1,3-hexanediol, 1,4-di(hydroxyethoxy) benzene, 2,2-bis(4-hydroxycyclohexyl)propane, 2,4-dihydroxy-1,1,3,3-tetramethyl cyclobutane, 2,2-bis(3-hydroxyethoxyphenyl)propane, 2,2-bis(4-hydroxypropoxy phenyl)propane, and their mixtures.

The crystallization retarding compound preferably comprises isophtalic acid or 1,4-cyclohexanedimethanol.

In one embodiment the crystallization retarding compound is a diacid being isophtalic acid, and:
the molar amount of isophtalic acid compared the total amount of diacid compound is of from 1.5% to 3.5%, and
the molar amount of terephtalate compound compared the total amount of diacid compound is of from 96.5% to 98.5%.

In one embodiment the crystallization retarding compound is 1,4-cyclohexanedimethanol, and:
the molar amount of 1,4-cyclohexanedimethanol compared the total amount of diol compound is of from 1.5% to 7.5%, and
the molar amount of terephtalate compound compared the total amount of diol compound is of form 92.5% to 98.5%.

Bio-PET Polymer Features and Copolymerization Step C)

According to a preferred embodiment of the invention, the bio-PET of the invention advantageously contains less than 4 mol %, preferably less than 3.5 mol %, of units corresponding to isophtalic acid, compared to the total number of diacid units, and less than 3.5 mol % of diethylene glycol units, compared to the total number of diol units.

In one embodiment:
the diacid compound of step A) comprises terephtalic acid and isophtalic acid, preferably from 96.5 mol % to 98.5 mol % of terephtalic acid and from 1.5 mol % to 3.5% mol % of isophtalic acid, and
the diol compound of step B) comprises monoethylene glycol bio-material, preferably 100% of monoethylene glycol bio-material.

In one embodiment:
the diacid compound of step A) comprises terephtalic acid bio-material and optionally isophtalic acid, and
the diol compound of step B) comprises monoethylene glycol bio-material and optionally 1,4-cyclohexanedimethanol,
with a provision that at the diol of step B) comprises 1,4-cyclohexanedimethanot if the diacid of step A) does not comprise isophtalic acid.

In one embodiment:
the diacid compound of step A) comprises terephtalic acid bio material and isophtalic acid, preferably from 96.5 mol % to 98.5 mol % of terephtalic acid bio-material and from 1.5 mol % to 3.5% mol % of isophtalic acid, and
the diol compound of step B) comprises monoethylene glycol bio-material, preferably 100% of monoethylene glycol bio-material.

Copolymerization step C) can be implemented according to processes known by the one skilled in the art, typically for copolymerizing substantially identical oil-based materials. It has been surprisingly found that bio-material monomers copolymerize well with the crystallization retarding compound.

Typically step C) comprises the following steps:
Step C1) melt polymerization, and
Step C2) solid state polymerization.

The step C1) of melt polymerization can comprise two successive sub-steps.

A first sub-step is referred to as an esterification or transesterification step and a second step as a polycondensation step.

According to the invention, the first sub-step can be implemented according to two different preparation routes.

A first preparation route uses dimethyl terephthalate. It involves a transesterification reaction. Molten dimethylterephtalate (DMT) is added to a large excess of monoethylene glycol (MEG), MEG:DMT molar ratio being approximately 1.7:2.2. The transesterification reaction is carried out at atmospheric pressure or at higher pressure (up to 8 kPa) and at a temperature of 150° C. to 250° C. approximately. It requires a catalyst, for example manganese acetate. Methanol is yielded during the reaction and is removed by distillation. Monoethylene glycol present in excess is removed after the transesterification reaction. The catalyst, which also acts as a catalyst for the decomposition of the obtained bio-PET, is blocked using phosphorus-containing compounds after the reaction. The product resulting from the transesterification reaction is a mixture of bis(hydroxyethyl) terephthalate and oligomers.

A second route is the "direct esterification" route. It involves an esterification reaction of terephthalic acid with monoethylene glycol. It is carried out at a temperature of 150° C. to 280° C. approximately. One typically uses a slight excess for terephtalic acid. MEG:terephtalic acid molar ratio is typically of approximately 1:1.4. The result of this reaction is a mixture of oligomers having acid and hydroxyethyl terminal functional groups.

The polycondensation step is typically carried out in the presence of a catalytic system like antimony oxide, titanium oxide, or germanium oxide. The polycondensation medium (a mixture of bis(hydroxyethyl) terephthalate, oligomers, and terephthalic acid, or oligomers having acid and hydroxyethyl terminal functional groups) is heated under stirring at a temperature of 245° C. to 280° C., and at a pressure of 10 Pa to 200 Pa approximately.

The bio-PET thus obtained is then typically poured into a die in order to obtain laces. After cooling, these laces are cut up to produce bio-PET granules. The bio-PET granules can be dried before further processing.

Preferably one implements a solid-state polycondensation by heating the bio-PET granules under vacuum, inert atmosphere or low oxidizing atmosphere, in order to obtain the degree of polymerization desired for the planned application.

The granules after can be used as starting material for feeding plants for spinning of yarns or fibres, or for conversion in a packaging element, for example for the extrusion of films, for the injection-blow moulding of hollow bodies, for the injection-moulding or thermoforming of articles having various forms.

It is mentioned that further various additives such as brighteners, dyes or other additives such as light or heat stabilisers or antioxidants or barrier agents may be added, either during at the copolymerization stage, or after by compounding with the bio-PET.

Using Recycled Materials

It is mentioned that the at least one terephtalate compound and/or monoethylene glycol obtained from a bio-material, provided at step A) and B) can be obtained from chemical recycling, as described on the recycling section below. One can typically use such material if a bio-PET was separated from conventional, typically oil-base PET, before recycling.

It is mentioned that the bio-PET can be mixed with recycled PET before implementation of step D), for example by mixing bio-PET chips or granules with recycled PET chips or granules, typically mechanically recycled PET chips or granules. Such mixing operations are known by the one skilled in the art. One preferably uses grades of recycled materials, with appropriate purity and chemical features, that are adapted for further conversion into a PET packaging. For example one can use a bottle grade recycled PET for making bottle at step D) Preferably the amount of recycled PET in the mixture is of lower than or equal to 50% by weight, for example form 10% to 40%. The mixture has typically a slightly reduced content of bio-material, but is also referred to herein as a bio-PET.

Step D) Packaging Element

The invention also concerns a method for producing a bio-PET packaging element, comprising the following steps:
performing the method of preparing the bio-PET, and
Step D) converting the bio-PET into the bio-PET packaging element.

The packaging element can be for example a container such as a bottle or a cup. The packaging element can be a film.

For example the packaging element can be a bottle and step D) can be carried out by injection blow molding or injection stretch blow molding. For example the packaging element can be a cup and step D) can be carried out by thermoforming. For example the packaging element can be a film and step D) can be carried out by extruding and stretching. Such packaging elements and methods are known by the one skilled in the art.

For making bottles one can implement an injection blow molding technology (including injection stretch blow molding technology). Thus Step D) can comprise the following sub-steps:
injecting the bio-PET into a preform mould to form a preform;
heating the preform at least above a glass transition point of the bio-PET;
blowing the preform into a mould, to obtain a bio-PET bottle.

After the sub-step of injecting and prior to the sub-step of heating the preform, one typically implements a step of cooling the preform.

The sub-step of injecting can comprise, for example, melting the bio-PET in a single or double screw injection-moulding machine. This allows plasticization of the bio-PET. It typically further comprises feeding plasticized bio-PET under pressure of $2.5 \cdot 10^7$ Pa (250 bars) to $5 \cdot 10^7$ Pa (500 bars) into a distributor equipped with heated nozzles and gate pins. For example the bio-PET is heated at a temperature of 260° C. to 285° C., advantageously 270° C. to 285° C., for example approximately 280° C. The lowest possible temperature for this sub-step will be used to limit formation of acetaldehyde, in particular for reducing rate of acetaldehyde formation.

In one embodiment the sub-step of injecting comprises:

melting the bio-PET in a single or double-screw injection-moulding machine at a temperature of 270° C. to 285° C., preferably 280° C.; and feeding the melted bio-PET under pressure of $2.5 \cdot 10^7$ Pa to $5 \cdot 10^7$ Pa, into a mould at a temperature of 260° C. to 285° C.

The bio-PET is then typically injected from the distributor into at least one preform mould. The preform mould is eventually equipped with cooling means adapted to control the cooling rate thereof and thus further preventing spherulitic crystallisation and yielding a preform, which does not exhibit no crystallization visible as white areas or haze. The preform mould can be cooled to a temperature of 0° C. to 10° C. This cooling can be achieved by using any suitable coolant such as glycol water. Advantageously, the sub-step of injecting and the sub-step of cooling together last approximately 10 sec. to 20 sec.

After this cooling inside the mould, the preform is typically ejected and cooled at ambient temperature.

If no cooling is carried out inside the preform mould, the preform can be introduced directly into a blowing installation.

The preform thus obtained can be generally used in blowing methods for bottle production. These blowing methods are also known and described in numerous publications.

The blowing installation with or without stretching or drawing typically comprises heating means.

The preform is typically heated at least above the glass transition point (Tg) of the bio-PET. Advantageously, the heating temperature for the preform is 80° C. to 100° C. This heating is carried out using any suitable means, for example infrared rays directed toward the external surface of the preform.

The blowing step can comprise a pre-blowing step and a final blowing step. The preform can be pre-blown by injection of a gas, advantageously under a first pressure of $4 \cdot 10^5$ Pa to $10 \cdot 10^5$ Pa (4 bar and 10 bar) for a first period of 0.15 to 0.6 seconds.

The preform can be then finally blown by a second injection of a gas, advantageously under a second pressure of $3 \cdot 10^6$ Pa to $4 \cdot 10^6$ Pa (30 bar and 40 bar) for a second period of 0.3 sec. to 2 sec. giving the bottle its final shape prior to ejection thereof out of the blowing installation after cooling.

It is also known to introduce a drawing rod into the preform during the blowing step, for example during the pre-blowing and/or final blowing operations in order to partially draw the preform.

Use of a bio-PET according to the invention leads to bottles having good properties such as light weight, transparency, resistance, at least equivalent to properties of the bottles or hollow containers made of oil-PET.

The bottles according to the invention are used for packaging any liquid product, in particular for packaging liquid commodity foods such as various natural, spring, carbonated or non-carbonated mineral waters and sweet carbonated or non-carbonated drinks generally known as soda. Thus the bio-PET packaging element can be a bottle, filled with carbonated drinks, natural still water, mineral still water, natural sparkling water or mineral sparkling water.

Recycling

The bio-PET packaging element can be recycled. Recycling operations are known by the one skilled in the art. In one embodiment the bio-PET packaging element is mechanically recycled in the form of PET chips or granules. The PET chips or granules will typically comprise some bio-based material obtained from the bio-PET. Then these chips or granules will be re-used to PET packaging elements. In one embodiment the bio-PET is chemically recycled to produce a stream of partially depolymerised PET, or 2 streams of monomers: one stream of diol comprising monoethylene glycol and one steam of diacid comprising a terephtalate compound. These streams can be re-used to prepare PET comprising bio-material. The partially depolymerised PET stream or at least one of the diol stream or the diacid stream will typically comprise some bio-based material obtained from the bio-PET. Then these streams can be typically re-used to prepare PET, typically by polymerization or further polymerization, and then PET packaging elements.

In one embodiment the bio-PET packaging element such as bottles is mixed with conventional, typically oil-based, PET packaging elements such as bottles, before recycling. Thus the recycled materials obtained will comprise a mixture of bio-materials. For example PET chips will comprise a mixture of bio-PET and conventional PET. For example the stream of partially depolymerised PET will comprise a mixture partially depolymerised bio-PET and depolymerised conventional PET. For examples at least one of the streams of diol and/or diacid will comprise a mixture of monoethylene glycol obtained from bio-material and of a oil-based monoethylene glycol, and/or a mixture of terephtalate compound obtained from bio-material and of a oil-based terephtalate compound. Thus in this embodiment, the bio-material will be diluted.

In one embodiment the bio-PET packaging element such as bottles to be recycled is separated, typically by sorting before recycling, from conventional, typically oil-based, PET packaging elements such as bottles. In this embodiment the bio-material will not be diluted and can re-use as such.

Example 1

A bio-PET containing 2.3 mol % of isophthalic acid, based on the total diacid monomer content, as crystallisation retarding compound, with terephtatic acid and monoethylene ethylene glycol as monomers, is produced in a polycondensation installation comprising a 7.5 L reactor, in the presence of an antimony oxide catalyst. The monoethylene glycol monomer bio-material obtained from bio-ethanol (obtained by the following process: sugar molasses transformed to ethanol by fermentation, ethanol transformed to ethylene, ethylene transformed to ethylene oxide, ethylene oxide transformed to monoethylene glycol).

The compounds engaged are as follows:
diacid: 97.7 mol % terephtatic acid+2.3 mol % isophtalic acid
diol 100% bio-based monoethylene glycol
molar ratio diacid/diol in polymer obtained: 1/1
catalyst (250 ppm, expressed as antimony weight, with reference to the weight of polymer obtained).
The synthesis is carried out in two steps:
esterification from 250° C. to 270° C. under pressure at 6.6 bars. The excess ethylene glycol is distilled at the end of this step; and
polycondensation at 285° C., under pressure at 0.7 to 0.5 mbar.

The polymerisation is stopped when the intrinsic viscosity of the polyester is 0.48 dL/g and contains 3.4 mol % of diethylene glycol units, based on the number of moles of ethylene glycol units. The bio-PET is put into granule form by extrusion into rods which are cut to yield granules having an average mass of 13 mg per granule.

The granules are crystallised in an oven for 30 minutes at 160° C., then placed in a column. A dry air flow (dew point tower than −60° C.) is passed through the column at a flow rate of 0.39 Nm³/h for 8 hours, temperature of the granules being kept at 180° C.

After a treatment period of 8 hours, the bio-PET has an intrinsic viscosity of 0.56 dL/g.

It is concluded that the monomers copolymerized well.

The bio-PET has a molar bio-sourced carbon atom content, measured according to ASTM D6866-10, of about 21%.

The bio-PET has weight a bio-material content, measured according to set of calculation rule (1) of about 31%.

Example 2

Bio-PET material of example 1 (75% by weight) and bottle-grade recycled PET (25% by weight) are melt compounded and the processed to make a 50 ml bottle in conventional injection blow molding bottle forming tines, using conventional processing parameters.

The process, the preforms, and the bottles are evaluated as similar to the process, preforms and bottles using oil-based materials. They do not exhibit crystallization and the aspect, resistance and process parameters are evaluated as equivalent.

The bio-PET has a bio-sourced carbon atom content, measured according to ASTM D6866-10, of about 16%.

The bio-PET has a weight bio-material content, measured according to set of calculation rule (1) of about 23%.

The invention claimed is:

1. A method for producing a bio-PET polymer comprising the following steps:
preparing a mixture comprising:
A) at least one diacid compound comprising a terephtalate compound;
B) at least one diol compound comprising monoethylene glycol; and
C) at least one crystallization retarding compound;
wherein:
at least one of the terephtalate compound and the monoethylene glycol is obtained from at least one bio-based material; and
copolymerizing the mixture to obtain a bio-PET polymer comprising diacid units and diol units, wherein the bio-PET polymer comprises up to 7.5 mol % of Links) corresponding to the at least one crystallization retarding compound, based on the total number of moles of diacid units contained in the bio-PET.

2. The method according to claim 1, wherein the at least one crystallization retarding compound is isophtalic acid.

3. The method according to claim 1, wherein the molar ratio in the bio-PET between units corresponding to the diacid compound(s) and units corresponding to the diol compound(s) is from 0.9 to 1.1.

4. The method according to claim 1, wherein the at least one crystallization retarding compound is isophthalic acid, and wherein
the molar amount of isophthalic acid compared the total amount of diacid compound is of from 1.5% to 3.5%, and
the molar amount of terephtalate compound compared the total amount of diacid compound is of from 96.5% to 98.5%.

5. The method according to claim 1, wherein at least a part of the monoethylene glycol is obtained from a bio-material.

6. The method according to claim 5, wherein the biomaterial, from which monoethylene glycol is obtained, is produced from one of the following raw materials:
plant;
plant waste.

7. The method according to claim 1, wherein the terephthalate compound is terephthalic acid or dimethyl-terephtalate.

8. The method according to claim 1, wherein at least a part of the terephtalate compound is obtained from a bio-material.

9. The method according to claim 8, wherein the biomaterial, from which the terephtalate compound is obtained, is produced from a biomass comprising terpene, terpenoid or a mixture thereof, or from para-xylene obtained from a bio-material, or from muconic acid obtained by a microbiological process from a biomass.

10. The method according to claim 1, wherein the copolymerization step comprises the following steps:
Step C1) melt polymerization, and
Step C2) solid state polymerization.

11. A method for producing a bio-PET packaging element, comprising the following steps:
performing the method of claim 1; and
Step D) converting the bio-PET into the bio-PET packaging element.

12. The method according to claim 11, wherein:
the packaging element is a bottle and step D) is carried out by injection blow molding or injection stretch blow molding, or
the packaging element is a cup and step D) is carried out by thermoforming, or
the packaging element is a film and step D) is carried out by extruding and stretching.

13. The method according to claim 12, wherein step D) comprises the following sub-steps:
injecting the bio-PET into a preform mould to form a preform;
heating the preform at least above the glass transition point of the bio-PET;
blowing the preform into a mould, to obtain a bio-PET bottle.

14. The method according to claim 13, wherein after the sub-step of injecting and prior to the sub-step of heating the preform, the sub-step of cooling the preform is implemented.

15. The method according to claim 13, wherein the sub-step of injecting comprises:
melting the bio-PET in a single or double-screw injection-moulding machine at a temperature of 270° C. to 285° C.,
feeding the melted bio-PET under pressure of $2.5 \cdot 10^7$ Pa to $5 \cdot 10^7$ Pa, into a mould at a temperature of 260° C. to 285° C.

16. The method according to claim 13, wherein the bio-PET packaging element is a bottle and is filled with carbonated drinks, natural still water, mineral still water, natural sparkling water or mineral sparkling water.

17. The method according to claim 6, wherein:
the plant is selected from beet, sugar cane, maize, wheat, citrus fruits, and woody plant;
the plant waste is selected from sawdust, wheat straw, wheat corns, natural fibres, cellulosics, lignocellulosics, and hemicelluloses.

18. The method according to claim 1, wherein the at least one crystallization retarding compound is chosen from isophthalic acid, naphthalenedicarboxylic acid, cyclohexanedicarboxylic acid, cyclohexanediacetic acid, succinic acid, glutaric acid, adipic acid, azelaic acid, sebacic acid, 1,3-propanediol, 1,4-butanediol, 1,5-pentanediol, 3-methyl-2,4-pentanediol, 2-methyl-1,4-pentanediol, trimethyl-1,3-pentanediol, 2-ethyl-1,3-hexanediol, 2,2-diethyl-1,3-propanediol, 1,3-hexanediol, 1,4-di(hydroxyethoxy)benzene, 2,2-bis(4-hydroxycyclohexyl)propane, 2,4-dihydroxy-1,1,3,3-tetramethylcyclobutane, 2,2-bis(3-hydroxyethoxyphenyl)propane, and 2,2-bis(4-hydroxypropoxyphenyl)propane.

19. The method according to claim 1, wherein the at least one crystallization retarding compound is 1,4-cyclohexanedimethanol.

20. The method according to claim 1, wherein the at least one crystallization retarding compound is succinic acid.

* * * * *

UNITED STATES PATENT AND TRADEMARK OFFICE
CERTIFICATE OF CORRECTION

PATENT NO. : 9,695,276 B2  
APPLICATION NO. : 14/343457  
DATED : July 4, 2017  
INVENTOR(S) : Francois Poulat Page 1 of 1

It is certified that error appears in the above-identified patent and that said Letters Patent is hereby corrected as shown below:

In the Claims

Claim 1, Column 13, Line 47, "Links)" should read as --unit(s)--.

Signed and Sealed this  
Seventeenth Day of October, 2017

Joseph Matal  
*Performing the Functions and Duties of the*  
*Under Secretary of Commerce for Intellectual Property and*  
*Director of the United States Patent and Trademark Office*